US010781321B2

United States Patent
Kimura et al.

(10) Patent No.: US 10,781,321 B2
(45) Date of Patent: Sep. 22, 2020

(54) COATING AGENT FOR OIL SEAL

(71) Applicant: NOK Corporation, Tokyo (JP)

(72) Inventors: Natsumi Kimura, Kanagawa (JP); Katsumi Abe, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 260 days.

(21) Appl. No.: 15/550,262

(22) PCT Filed: Feb. 10, 2016

(86) PCT No.: PCT/JP2016/053910
§ 371 (c)(1),
(2) Date: Aug. 10, 2017

(87) PCT Pub. No.: WO2016/132982
PCT Pub. Date: Aug. 25, 2016

(65) Prior Publication Data
US 2018/0030287 A1 Feb. 1, 2018

(30) Foreign Application Priority Data
Feb. 17, 2015 (JP) ................. 2015-028287

(51) Int. Cl.
C09D 7/40 (2018.01)
F16J 15/3284 (2016.01)
F16J 15/3204 (2016.01)
C09D 153/00 (2006.01)
C09D 7/65 (2018.01)
C09D 109/00 (2006.01)
C09D 7/61 (2018.01)
F16J 15/32 (2016.01)
C08L 27/00 (2006.01)
C08L 27/18 (2006.01)
C08L 69/00 (2006.01)
C08L 83/04 (2006.01)
C08K 3/36 (2006.01)

(52) U.S. Cl.
CPC ................. C09D 7/65 (2018.01); C09D 7/40 (2018.01); C09D 7/61 (2018.01); C09D 7/68 (2018.01); C09D 7/69 (2018.01); C09D 109/00 (2013.01); C09D 153/00 (2013.01); F16J 15/3204 (2013.01); F16J 15/3284 (2013.01); C08K 3/36 (2013.01); C08L 27/00 (2013.01); C08L 27/18 (2013.01); C08L 69/00 (2013.01); C08L 83/04 (2013.01); F16J 15/32 (2013.01)

(58) Field of Classification Search
CPC ... C09D 7/65; C09D 7/68; C09D 7/61; C09D 7/69; C09D 153/00; C09D 7/40; C09D 109/00; C08L 83/04; C08L 69/00; C08L 27/18; C08L 27/00; C08K 3/36; F16J 15/3284; F16J 15/3204; F16J 15/03
See application file for complete search history.

(56) References Cited

U.S. PATENT DOCUMENTS

2009/0200750 A1 8/2009 Takeno et al.

FOREIGN PATENT DOCUMENTS

| JP | 2003-213122 A | 7/2003 |
|---|---|---|
| JP | 3893985 | 12/2006 |
| JP | 2007332269 A | * 12/2007 |
| JP | 2008-189892 A | 8/2008 |
| JP | 2006-292160 A | 12/2011 |
| JP | 4873120 | 12/2011 |
| WO | WO 2016/047640 A1 | 3/2016 |
| WO | WO 2016/047641 A1 | 3/2016 |

OTHER PUBLICATIONS

Tora, Toshihiro et al., JP-2007332269-A, Dec. 27, 2007 (Machine translation) (Year: 2007).*
International Search Report from corresponding PCT application No. PCT/JP2016/053910 dated May 17, 2016 (4 pgs).
International Preliminary Report on Patentability and Written Opinion from corresponding PCT application No. PCT/JP2016/053910 dated Aug. 22, 2017 (8 pgs).

* cited by examiner

Primary Examiner — Cheng Yuan Huang

(57) ABSTRACT

A coating agent for oil seal comprising 10 to 160 parts by weight of a filler having a particle size of 0.5 to 30 □m based on 100 parts by weight of isocyanate group-containing 1,2-polybutadiene and being prepared as an organic solvent solution, wherein a contact angle between a substrate surface coated with the coating agent and engine oil is less than 35°. The coating agent can improve wettability with oil and reduce dynamic friction coefficient in oil, while increasing the roughness of the coating surface. Thus, low torque characteristics can be achieved, while maintaining excellent seal performance inherent in oil seal.

2 Claims, No Drawings

COATING AGENT FOR OIL SEAL

RELATED APPLICATION

This application is a 35 U.S.C. § 371 national phase filing of International Patent Application No. PCT/JP2016/053910, filed Feb. 10, 2016, which claims priority under 35 U.S.C. § 119 to Japanese Patent Application No. 2015-028287, filed Feb. 17, 2015, the entire disclosure of which is hereby expressly incorporated by reference.

TECHNICAL FIELD

The present invention relates to a coating agent for oil seal. More particularly, the present invention relates to a coating agent for oil seal capable of reducing friction in oil.

BACKGROUND ART

Oil seal is widely used as an important machine element in the field of vehicles, industrial machines, and the like. Oil seal is used for the purpose of movement and sliding; however, in that case, deterioration of the seal oil and the sealing material due to the frictional heat of the seal, and energy loss in devices due to frictional resistance are often problematic.

In order to reduce the torque of the oil seal, it is preferable that oil is held on the sliding surface. For this purpose, it is required to improve wettability with oil, while increasing the roughness of the sliding surface. However, in the case of a coating agent comprising, as a filler, fluororesin particles having a low particle size of 0.1 to 10 µm, which were conventionally used in coating agents, the surface energy of fluororesin was high, so that it was difficult to significantly improve wettability with oil. Further, because of the small particle size, it was also difficult to increase the roughness of the coating surface.

Meanwhile, the friction of oil seal can be reduced by forming a coating film of a material having a frictional coefficient lower than that of the sealing material on the sliding surface of the oil seal lip part; however, if the coating film is removed during sliding, the effect of reducing friction is lost.

The present applicant has previously proposed, in Patent Documents 1 and 2, surface-treating agents for vulcanized rubber comprising 10 to 160 parts by weight respectively of wax having a softening point of 40 to 160° C. and fluororesin, or 10 to 160 parts by weight respectively of fluororesin and polyethylene resin, based on 100 parts by weight of isocyanate group-containing 1,2-polybutadiene, wherein the surface-treating agents are prepared as organic solvent solutions. These surface-treating agents are supposed to be effectively applicable to oil seal, and the like; however, further lower torque characteristics have recently been demanded.

PRIOR ART DOCUMENTS

Patent Documents

Patent Document 1: JP-B-3893985
Patent Document 2: JP-B-4873120

OUTLINE OF THE INVENTION

Problem to be Solved by the Invention

An object of the present invention is to provide a coating agent that can achieve low torque characteristics, while maintaining excellent seal performance inherent in oil seal.

Means for Solving the Problem

The above object of the present invention can be achieved by a coating agent for oil seal comprising 10 to 160 parts by weight of a filler having a particle size of 0.5 to 30 µm based on 100 parts by weight of isocyanate group-containing 1,2-polybutadiene and being prepared as an organic solvent solution, wherein a contact angle between a substrate surface coated with the coating agent and engine oil is less than 35°.

Effect of the Invention

As the filler contained in the coating agent, a filler that has a large particle size and that results in a contact angle of less than 35° between a substrate surface coated with the coating agent and engine oil is selected to thereby can improve wettability with oil and reduce dynamic friction coefficient in oil, while increasing the roughness of the coating surface. Thus, the excellent effect of achieving low torque characteristics can be exhibited.

EMBODIMENTS FOR CARRYING OUT THE INVENTION

As the isocyanate group-containing 1,2-polybutadiene, one having a molecular weight of about 1,000 to 3,000 in which an isocyanate group is added as a terminal group is used. This can be a commercial product, for example, Nisso TP-1001 produced by Nippon Soda Co., Ltd. (solution containing 50 wt. % of butyl acetate) can be used as it is. Because an isocyanate group is added as a terminal group, reaction with the functional group on the surface of vulcanized rubber and the hydroxyl group-containing component occurs to cause bonding and curing. The affinity and compatibility with rubber of the polybutadiene resin are superior to those of polyurethane resin that similarly react with an isocyanate group to achieve a higher molecular weight. Thus, the polybutadiene resin is characterized by excellent adhesion with rubber, particularly excellent friction and abrasion resistance characteristics.

Usable fillers are those that have a particle size of about 0.5 to 30 µm, preferably about 1.0 to 30 µm, that are eventually prepared as coating agents, and that result in, after coating of an oil seal surface, a contact angle of less than 35° or less between the coated substrate surface and engine oil (e.g., Engine Oil OW-20). Examples thereof include particles of fluororesin, silica, silicone resin, polycarbonate, urethane resin, acrylic resin, carbon black, or the like. If the particle size of the filler is smaller than the above range, the roughness of the coating surface is smaller, the effect of holding oil cannot be maintained, and the torque of the seal sliding surface is higher. In contrast, if the particle size of the filler is greater than the above range, the roughness of the coating surface is greater, and sealing properties are deteriorated to cause the leakage of oil. In addition, if a filler that results in a contact angle after coating greater than the above range is used, oil is repelled, the oil holding force of the oil seal sliding surface is impaired, and it is difficult to achieve desired low torque characteristics.

Examples of fluororesin include polytetrafluoroethylene [PTFE], tetrafluoroethylene/hexafluoropropylene copolymers, tetrafluoroethylene/perfluoro-alkyl vinyl ether) copolymers, polyvinylidene fluoride, polyvinyl fluoride, ethylene/tetrafluoroethylene copolymers, and the like. Usable examples of such fluororesin particles include particles prepared by classifying a fluororesin obtained by block polymerization, suspension polymerization, solution polymerization, emulsion polymerization, or the like to a particle size of about 0.5 to 30 µm; particles prepared by finely dispersing a dispersion obtained by suspension polymerization, solution polymerization, emulsion polymerization, or the like, by shear stirring, etc., to a particle size of about 0.5 to 30 µm; or particles prepared by coagulating and drying a product obtained by polymerization mentioned above, followed by atomization to a particle size of about 30 µm or less by dry pulverization or cooling pulverization.

Moreover, examples of silica include amorphous silica, such as dry-process silica produced by, for example, thermal decomposition of halogenated silicate or an organosilicon compound, or heat reduction of silica sand, followed by air oxidation of vaporized SiO; and wet-process silica produced by, for example, thermal decomposition of sodium silicate. Examples of the silicone resin include condensation reaction type silicone resin, addition reaction type silicone resin, and ultraviolet or electron beam curable silicone resin. Examples of polycarbonate include aromatic polycarbonate, aliphatic polycarbonate, aliphatic-aromatic polycarbonate, and the like. In the present invention, these are not particularly limited as long as the particle size is about 0.5 to 30 µm. Commercial products thereof can be used as they are.

The filler is used at a rate of about 10 to 160 parts by weight, preferably about 25 to 120 parts by weight, based on 100 parts by weight of the isocyanate group-containing 1,2-polybutadiene. If the ratio of the filler is greater than this range, adhesion with rubber and friction • abrasion resistance characteristics are deteriorated, the flexibility of the coating is impaired, and cracks are formed on the coating film after curing. In contrast, if the ratio of the filler is less than this range, sliding properties and non-adhesiveness are deteriorated, and the frictional coefficient of the coating surface increases.

The isocyanate group-containing 1,2-polybutadiene and the filler are prepared as a solution (dispersion) of an organic solvent, which is used as a coating agent for oil seal. Examples of the organic solvent include toluene, xylene, ethyl acetate, butyl acetate, methyl ethyl ketone, methyl isobutyl ketone, and the like. For such organic solvents, ones that are commercially available in general may be used as they are. The amount of dilution with an organic solvent is suitably selected depending on the coating thickness and the coating method. The film thickness is generally about 1 to 30 µm, preferably about 3 to 20 µm. If the film thickness is less than this range, the entire rubber surface cannot be coated, and sliding properties and non-adhesiveness may be impaired. In contrast, if the film thickness is greater than this range, the stiffness of the coating surface becomes higher, and sealing properties and flexibility may be impaired. The film thickness is preferably about 3 to 20 µm for use application such as seal parts.

Examples of the rubber for oil seal that can be treated with such a coating agent include general rubber materials such as fluororubber, nitrile rubber, hydrogenated nitrile rubber, ethylene-propylene rubber, styrene-butadiene rubber, acrylic rubber, chloroprene rubber, butyl rubber, and natural rubber. Among them, rubber materials having little blooming of a rubber compounding agent such as an antioxidant and oil, which are compounded in the rubber, to the rubber surface layer are preferably used. The compounding proportion of each component, the type of organic solvent, the amount of organic solvent, and the organic solvent mixing ratio are suitably selected depending on the rubber material and the purpose.

Examples of the coating method of the coating agent to an oil seal surface include, but are not limited thereto, dipping, spraying, roll coater, flow coater, and the like. In this case, it is preferable that dirt, and the like, on the rubber surface are previously removed by washing or the like before the coating agent is applied. In particular, washing with water, a detergent, a solvent, etc., and drying are performed when materials bloomed and bled from the rubber are deposited on its surface.

After the coating agent is applied to the oil seal surface, heat treatment is performed at about 150 to 250° C. for about 10 minutes to 24 hours. If the heating temperature is lower than this range or the heating time is shorter than this range, the curing of the film and the adhesion with the rubber are insufficient, and non-adhesiveness and sliding properties are deteriorated. In contrast, if the heating temperature is higher than this range or the heating time is longer than this range, heat aging of the rubber occurs. Therefore, it is necessary to suitably set the heating temperature and heating time depending on the heat resistance of various rubbers.

Moreover, for item for which a reduction in the amount of outgassing is required, heat treatment, reduced pressure treatment, extraction treatment, etc., can be performed singly or in combination; however, heat treatment is economically the best. In order to reduce the amount of outgassing, heat treatment at about 150 to 250° C. for about 1 to 24 hours is preferable. In order to gasify low-molecular components in the rubber and low-molecular components contained in polybutadiene in the film, the higher the temperature and the longer the time, the more effective.

EXAMPLES

The following describes the present invention with reference to Examples.

Example 1

| | |
|---|---|
| Isocyanate group-containing 1,2-polybutadiene (TP1001, produced by Nippon Soda Co., Ltd.; containing 50% of butyl acetate) | 200 parts by weight (100 parts by weight) |
| Silica (Silica 6B, produced by Chuo Silica Co., Ltd.; particle size: 7 µm) | 43 parts by weight |
| Butyl acetate | 1798 parts by weight |

The above components were mixed, and a coating agent solution comprising this butyl acetate solution was spray coated to vulcanized rubber (thickness: 2 mm) to a thickness of 10 to 30 µm, followed by heat treatment at 200° C. for 10 hours. Then, the contact angle and the dynamic friction coefficient in oil were measured. Each of the part by weight is represented by a part by weight of the solution, and the actual part by weight of each component is shown in parentheses (the same applies to the following Examples and Comparative Examples).

Contact angle: Using Drop Master 500 (produced by Kyowa Interface Science Co., Ltd.), the contact angle to Engine Oil OW-20 was measured A contact angle of less than 35° was evaluated as 0, and that of 35° or more was evaluated as x Dynamic friction coefficient in oil: Using a surface property tester (HEIDON TYPE14DR, produced by Shinto Scientific Co., Ltd.), reciprocation was carried out under the following conditions, and the dynamic friction coefficient on the forward side was measured. A dynamic friction coefficient of less than 0.2 was evaluated as 0, and that of 0.2 or more was evaluated as x Load: 50 g
Rate: 50 mm/min
Reciprocation distance: 50 mm
Indenter: a steel ball having a diameter of 10 mm
Oil type: Engine Oil OW-20

Note: The dynamic friction coefficient in oil is an evaluation correlated with the real system evaluation of oil seal. When the dynamic friction coefficient in oil using the above test piece is low, the real system evaluation using oil seal is supposed to be excellent.

Example 2

In Example 1, 614 parts by weight (43 parts by weight as polycarbonate) of polycarbonate (Polycarbonate TR-7; produced by Gifu Shellac Manufacturing Co., Ltd.; particle size: 6 μm; containing 93% of toluene) was used in place of silica.

Example 3

In Example 1, the same amount (43 parts by weight) of silicone resin particles (Tospearl 130, produced by Momentive Performance Materials Inc.; particle size: 3 μm) was used in place of silica.

Example 4

In Example 1, the same amount (43 parts by weight) of silicone resin particles (X-52-703, produced by Shin-Etsu Chemical Co., Ltd.; particle size: 0.8 μm) was used in place of silica.

Comparative Example 1

In Example 1, the same amount (43 parts by weight) of silicone resin particles (Nylon SP-10, produced by Toray Co., Ltd.; particle size: 10 μm) was used in place of silica.

Comparative Example 2

In Example 1, the same amount (43 parts by weight) of silicone rubber particles (TORAYFIL E606, produced by Toray Co., Ltd.; particle size: 2 μm) was used in place of silica.

Comparative Example 3

In Example 1, the same amount (43 parts by weight) of PTFE (Fluon 172J, produced by AGC Seimi Chemical Co., Ltd.; particle size: 0.2 μm) was used in place of silica.

Reference Example

In Example 1, the coating agent solution was replaced with a coating agent solution comprising 50 parts by weight of polybutadiene, 1567 parts by weight of a PTFE solution (solid matters content: 5%; 78.35 parts by weight), and 1567 parts by weight of a polyethylene wax solution (solid matters content: 5%; 78.35 parts by weight), which corresponds to the invention disclosed in Patent Document 1.

The results obtained in the foregoing Examples, Comparative Examples, and Reference Example are shown in the following Table.

TABLE

| Measurement · evaluation item | Example | | | | Comparative Example | | | Reference Example |
|---|---|---|---|---|---|---|---|---|
| | 1 | 2 | 3 | 4 | 1 | 2 | 3 | |
| Contact angle | 10.8 | 8.7 | 22.7 | 30.5 | 42.1 | 38.2 | 38.1 | 39.7 |
| | ○ | ○ | ○ | ○ | X | X | X | X |
| Dynamic friction coefficient in oil | 0.15 | 0.15 | 0.18 | 0.19 | 0.27 | 0.26 | 0.25 | 0.28 |
| | ○ | ○ | ○ | ○ | X | X | X | X |

INDUSTRIAL APPLICABILITY

The coating agent of the present invention achieves low torque characteristics, while maintaining excellent seal performance inherent in oil seal; therefore, the coating agent of the present invention can be effectively used not only for oil seal, but also for prevention of adhesion, reduction of friction, prevention of abrasion, etc., of rubber parts, such as rubber rolls for copiers, rubber belts for copiers, industrial rubber hoses, industrial rubber belts, wipers, automobile weather strips, glass runs, and the like.

The invention claimed is:

1. An organic solvent solution based coating agent for oil seal comprising 10 to 160 parts by weight of a filler having a particle size of 0.5 to 30 μm based on 100 parts by weight of isocyanate group-containing 1,2-polybutadiene, wherein the organic solvent solution based coating agent provides a contact angle between a substrate surface coated with the coating agent and engine oil of less than 35°, wherein the filler is silica, silicone resin or polycarbonate.

2. An oil seal coated with the coating agent according to claim 1.

* * * * *